(12) United States Patent
Johnson et al.

(10) Patent No.: US 11,533,396 B2
(45) Date of Patent: Dec. 20, 2022

(54) VALIDATING TELEPHONE CALLS BY VERIFYING ENTITY IDENTITIES USING BLOCKCHAINS

(71) Applicant: Numeracle, Inc., Arlington, VA (US)

(72) Inventors: Rebekah Johnson, McLean, VA (US); Mohamed S. Jaffer, Pennington, NJ (US)

(73) Assignee: Numeracle, Inc., Arlington, VA (US)

( * ) Notice: Subject to any disclaimer, the term of this patent is extended or adjusted under 35 U.S.C. 154(b) by 0 days.

(21) Appl. No.: 17/149,194

(22) Filed: Jan. 14, 2021

(65) Prior Publication Data

US 2021/0136196 A1 May 6, 2021

Related U.S. Application Data

(63) Continuation of application No. 16/821,040, filed on Mar. 17, 2020, now Pat. No. 10,979,557.
(Continued)

(51) Int. Cl.
*H04M 3/42* (2006.01)
*H04L 9/06* (2006.01)
(Continued)

(52) U.S. Cl.
CPC ...... *H04M 3/42042* (2013.01); *H04L 9/0637* (2013.01); *H04M 3/42059* (2013.01); *H04M 3/436* (2013.01); *H04L 9/50* (2022.05)

(58) Field of Classification Search
CPC ............ H04L 2209/38; H04L 9/3239; H04L 9/0643; H04L 9/3236; H04L 9/3297; H04L 9/3247; H04L 2209/56; H04L 9/0637; H04L 67/104; H04L 63/0876; H04L 63/08; H04L 9/3263; H04L 63/0428; H04L 67/1097; H04L 9/3231; H04L 63/0861; H04L 9/0825; H04L 9/0894; H04L 63/12; H04L 9/0861; H04L 9/3213; H04L 9/30; H04L 9/0897; H04L 63/083;
(Continued)

(56) References Cited

U.S. PATENT DOCUMENTS 4,184,148 A * 1/1980 Smagala-Romanoff ..................... G07F 7/10 235/494
10,652,184 B1 * 5/2020 Winter .................. H04L 9/3221
(Continued)

FOREIGN PATENT DOCUMENTS

| CH | 714242 B1 * | 4/2019 | ............. G06Q 20/00 |
| KR | 20110070106 | 6/2011 | |
| WO | WO-2018187634 A1 * | 10/2018 | ......... G06K 9/00892 |

OTHER PUBLICATIONS

Application No. PCT/US2020/023083, International Search Report and Written Opinion, dated Jul. 8, 2020, 7 pages.
(Continued)

*Primary Examiner* — Akelaw Teshale
(74) *Attorney, Agent, or Firm* — Kilpatrick Townsend & Stockton LLP

(57) ABSTRACT

Telephone calls can be validated using blockchains. In one example, a computing node can generate a distributed ledger indicating relationships between telephone numbers and unique identifiers assigned to the telephone numbers. The distributed ledger can be accessible to a telecommunication system for validating telephone calls.

20 Claims, 8 Drawing Sheets

Related U.S. Application Data

(60) Provisional application No. 62/819,977, filed on Mar. 18, 2019.

(51) Int. Cl.
*H04M 3/436* (2006.01)
*H04L 9/00* (2022.01)

(58) Field of Classification Search
CPC ..... H04L 63/123; H04L 9/14; H04L 63/0815; H04L 63/0442; H04L 63/10; H04L 67/12; H04L 9/321; H04L 63/0823; H04L 67/10; H04L 9/0869; H04L 2463/082; H04L 9/0891; H04L 63/0838; H04L 63/102; H04L 9/3242; H04L 63/1466; H04L 67/1095; H04L 9/0618; H04L 9/0838; H04L 9/32; H04L 2209/805; H04L 61/15; H04L 9/0822; H04L 9/085; H04L 2209/80; H04L 51/32; H04L 63/0407; H04L 63/0853; H04L 63/101; H04L 9/008; H04L 9/3226; H04L 9/3268; H04L 61/103; H04L 63/126; H04L 63/18; H04L 9/088; H04L 9/3228; H04L 9/3271; H04L 2209/127; H04L 63/0884; H04L 9/3234; H04L 9/3255; H04L 9/3265; H04L 2463/102; H04L 29/06; H04L 63/06; H04L 63/0807; H04L 67/025; H04L 67/125; H04L 9/0836; H04L 9/0866; H04L 63/061; H04L 63/105; H04L 67/1078; H04L 12/18; H04L 41/22; H04L 51/10; H04L 63/0435; H04L 63/20; H04L 67/18; H04L 67/20; H04L 67/2842; H04L 67/32; H04L 9/06; H04L 9/0819; H04L 9/0863; H04L 12/04; H04L 12/06; H04L 12/08; H04L 2209/42; H04L 2209/463; H04L 2209/608; H04L 41/08; H04L 41/0823; H04L 41/0893; H04L 41/0896; H04L 41/12; H04L 41/145; H04L 41/30; H04L 41/5019; H04L 47/70; H04L 61/1511; H04L 61/157; H04L 61/30; H04L 63/04; H04L 63/0869; H04L 63/0892; H04L 63/108; H04L 67/02; H04L 67/06; H04L 67/40; H04L 9/3073; H04L 9/3218; H04L 9/3221; H04L 12/14; H04L 2209/603; H04L 2463/101; H04L 2463/121; H04L 51/12; H04L 51/16; H04L 51/18; H04L 51/36; H04L 61/605; H04L 63/0478; H04L 63/062; H04L 63/1416; H04L 65/1073; H04L 67/00; H04L 67/1059; H04L 67/22; H04L 67/26; H04L 67/30; H04L 67/38; H04L 9/002; H04L 9/0833; H04L 9/0841; H04L 9/3215; H04L 9/3273; H04L 12/1403; H04L 12/1442; H04L 12/1446; H04L 12/2803; H04L 12/4641; H04L 12/66; H04L 2209/88; H04L 2463/144; H04L 29/08; H04L 41/044; H04L 41/046; H04L 41/0604; H04L 41/0631; H04L 45/74; H04L 51/04; H04L 51/22; H04L 51/28; H04L 51/34; H04L 61/20; H04L 61/301; H04L 61/35; H04L 61/6063; H04L 62/03; H04L 63/0218; H04L 63/0227; H04L 63/0281; H04L 63/0421; H04L 63/045; H04L 63/0464; H04L 63/065; H04L 63/1433; H04L 63/1441; H04L 65/1006; H04L 65/1066; H04L 65/1069; H04L 65/1096; H04L 67/1065; H04L 67/1076; H04L 67/141; H04L 67/16; H04L 67/28; H04L 67/2809; H04L 67/2814; H04L 67/306; H04L 69/22; H04L 9/00; H04L 9/006; H04L 9/007; H04L 9/0877; H04L 9/12; H04L 9/302; H04L 9/3249; H04M 3/42297; H04M 3/436; H04M 3/42042; H04M 3/42059; H04M 2203/6045; H04M 1/663; H04M 1/72463; H04M 3/42; H04M 7/0075; H04M 1/725; H04M 2203/558; H04M 2203/6027; H04M 3/00; H04M 7/0063; H04M 1/72415; H04M 1/72484; H04M 15/00; H04M 3/2218; H04M 3/42144; H04M 3/42221; H04M 3/4365; H04M 15/49; H04M 15/50; H04M 2203/2027; H04M 3/5166; H04M 3/5232; H04M 3/58
See application file for complete search history.

(56) References Cited

U.S. PATENT DOCUMENTS

| | | | |
|---|---|---|---|
| 10,771,624 B1* | 9/2020 | Penar | H04L 63/08 |
| 11,025,409 B1* | 6/2021 | Fields | H04L 9/50 |
| 11,089,478 B2* | 8/2021 | Moshir | H04L 63/0428 |
| 2012/0028606 A1 | 2/2012 | Bobotek | |
| 2016/0342994 A1 | 11/2016 | Davis | |
| 2016/0381213 A1* | 12/2016 | Murynets | H04M 3/2227 455/466 |
| 2017/0206532 A1* | 7/2017 | Choi | G06Q 30/02 |
| 2017/0317833 A1 | 11/2017 | Smith et al. | |
| 2017/0366348 A1* | 12/2017 | Weimer | H04L 9/3247 |
| 2018/0013881 A1 | 1/2018 | Cooper | |
| 2018/0205725 A1 | 7/2018 | Cronkright et al. | |
| 2018/0227429 A1 | 8/2018 | McGarry | |
| 2018/0255130 A1* | 9/2018 | Kozloski | H04L 9/3239 |
| 2018/0285879 A1* | 10/2018 | Gadnis | H04L 9/0825 |
| 2019/0044917 A1 | 2/2019 | Mork et al. | |
| 2019/0208418 A1* | 7/2019 | Breu | H04L 9/3239 |
| 2019/0229931 A1* | 7/2019 | Uzelac | G06Q 20/1235 |
| 2019/0268466 A1* | 8/2019 | Inoue | H04L 9/3247 |
| 2019/0311102 A1 | 10/2019 | Tussy | |
| 2019/0327216 A1* | 10/2019 | Walters | H04L 9/0866 |
| 2019/0354964 A1 | 11/2019 | Snow | |
| 2019/0384748 A1 | 12/2019 | Roennow et al. | |
| 2020/0111082 A1* | 4/2020 | Wu | G06Q 20/3674 |
| 2020/0119936 A1* | 4/2020 | Balasaygun | H04L 12/1831 |
| 2020/0143480 A1 | 5/2020 | Strother | |
| 2020/0242105 A1* | 7/2020 | Rich | H04L 67/1097 |
| 2020/0244642 A1* | 7/2020 | Arora | H04L 9/0861 |

OTHER PUBLICATIONS

"Anonymous", Certificate Transparency, Feb. 16, 2019, 3 pages.
Bax et al., "Method and System for Countering Phone Number Spoofing ED—Darl Kuhn", IP.com, Apr. 17, 2018, 6 pages.
EP Application No. EP20773829.5 , Extended European Search Report, dated Apr. 11, 2022, 9 pages.
Huahong et al., "Toward Authenticated Caller Id Transmission: The Need for a Standardized Authentication Scheme in Q.731.3 Calling Line Identification Presentation", ICTs for a Sustainable World, 2016, pp. 1-8.

* cited by examiner

VALIDATING TELEPHONE CALLS BY VERIFYING ENTITY IDENTITIES USING BLOCKCHAINS

CROSS-REFERENCE TO RELATED APPLICATIONS

This application is a continuation of U.S. Non-Provisional application Ser. No. 16/821,040, entitled "Validating Telephone Calls by Verifying Entity Identities Using Blockchains," filed Mar. 17, 2020, which claims the benefit of priority to U.S. Provisional Patent Application No. 62/819,977, entitled, "Validating Telephone Calls By Verifying Entity Identities Using Blockchains," filed Mar. 18, 2019, the entirety of both of which are incorporated by reference herein.

TECHNICAL FIELD

The present disclosure relates generally to validating telephone calls. More specifically, but not by way of limitation, this disclosure relates to validating telephone calls by verifying entity identities using blockchains.

BACKGROUND

The volume of automated telephone calls ("robocalls") has recently skyrocketed, with billions of robocalls being made each month. Although telecommunication carriers and regulators appreciate the magnitude of the problem, their attempts to curb robocalls have had little success. The lack of success is in large part due to how a telephone call ("call") propagates through a maze of carriers and networks before reaching the recipient, making it difficult to pinpoint the call's origins and enabling the caller to evade regulation.

SUMMARY

One example of the present disclosure includes a computing node with a processor and a memory including instructions executable by the processor. The instructions can cause the processor to generate a distributed ledger indicating relationships between telephone numbers and unique identifiers assigned to the telephone numbers; and configure the distributed ledger for use by a telecommunication system to verify a telephone call.

Another example of the present disclosure includes a method involving generating a distributed ledger indicating relationships between telephone numbers and unique identifiers assigned to telephone numbers. The method can also involve configuring the distributed ledger for use by a telecommunication system to verify a telephone call. Some or all of these steps can be implemented by a computing device.

Still another example of the present disclosure includes a telecommunication system comprising a computing node communicatively couplable to another computing node of another telecommunication system to operate a blockchain distributed among the computing nodes. The blockchain includes telephone numbers correlated to unique identifiers assigned to the telephone numbers. The telecommunication system is configured to: receive a communication from the other telecommunication system, the communication being associated with a caller requesting to make a telephone call using a caller telephone number to a recipient; extract a unique identifier and the caller telephone number from the communication; determine whether the caller telephone number is correlated to the unique identifier in the blockchain; authorize or block the telephone call depending on whether or not the caller telephone number is correlated to the unique identifier in the blockchain.

Yet another example of the present disclosure includes a method implemented by a first telecommunication system. The method can include receiving a communication from a second telecommunication system, the communication being associated with a caller requesting to make a telephone call using a caller telephone number to a recipient; extracting a unique identifier and the caller telephone number from the communication; determining whether the caller telephone number is correlated to the unique identifier in a blockchain distributed among the first and second telecommunication systems; authorizing or blocking the telephone call depending on whether or not the caller telephone number is correlated to the unique identifier in the blockchain.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

DETAILED DESCRIPTION

Figure 1:
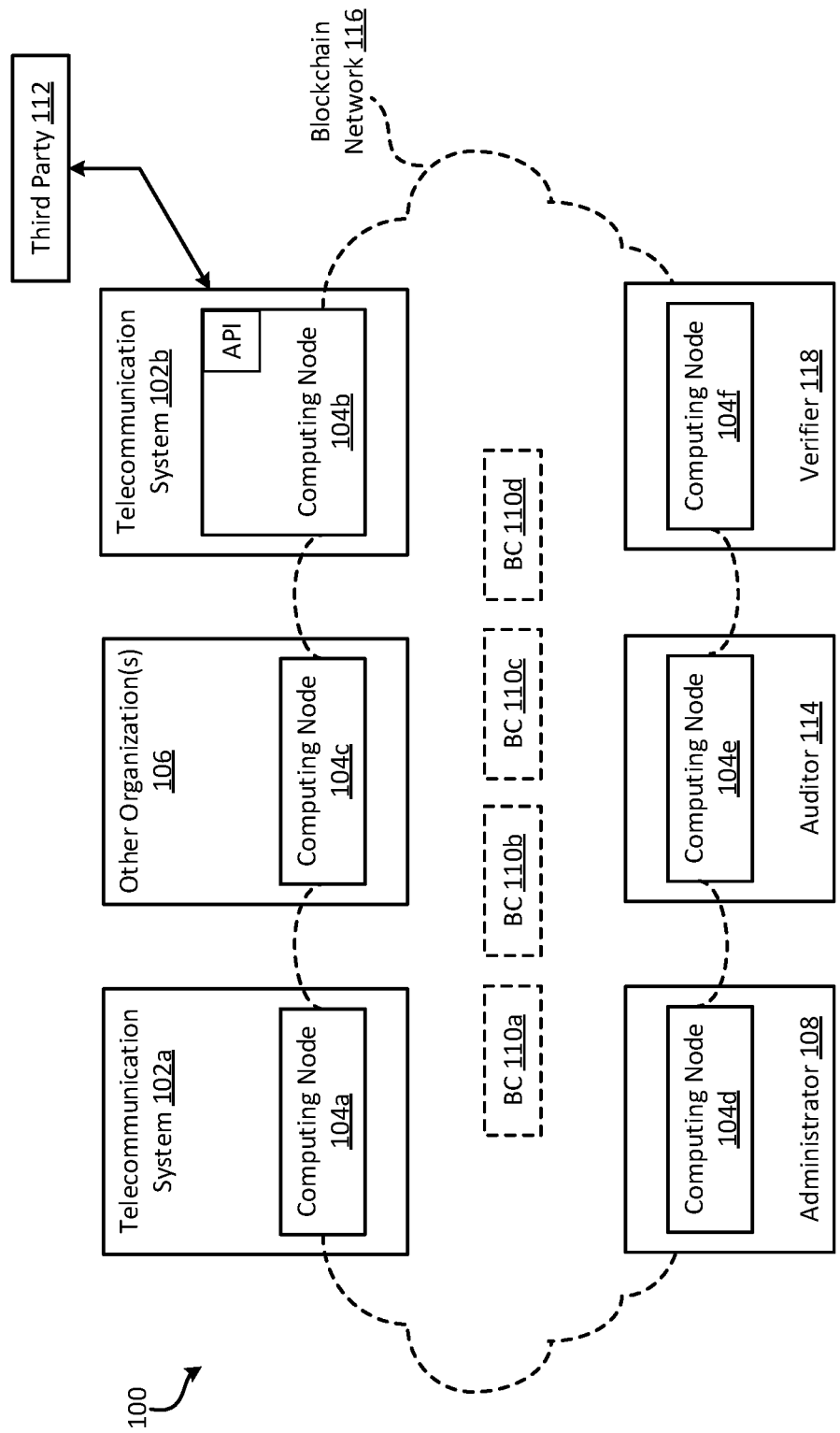
FIG. 1 is a block diagram of an example of a system for validating telephone calls using blockchains according to some aspects.

Reference will now be made in detail to various and alternative illustrative examples and to the accompanying drawings. Each example is provided by way of explanation and not as a limitation. It will be apparent to those skilled in the art that modifications and variations may be made. For instance, features illustrated or described as part of one example may be used in another example to yield a still further example. Thus, it is intended that this disclosure includes modifications and variations as come within the scope of the appended claims and their equivalents.

As used herein, the terms "a," "an," and "the" can refer to one or more unless specifically noted otherwise. And the term "or" is not to be construed as identifying mutually exclusive options. For example, the phrase "X contains A or B" can mean that X contains A and not B, X contains B and not A, or X contains both A and B. That is, the term "or" is used to mean "and/or" unless explicitly indicated to refer to alternatives only or the alternatives are mutually exclusive.

Illustrative Example of Validating Telephone Calls Using Blockchains

One illustrative example of the present disclosure includes a group of computing nodes collectively forming a blockchain network comprising a first blockchain. The first blockchain includes relationships between telephone numbers and corresponding attributes, such as unique identifiers assigned to the telephone numbers. At least some of the computing nodes are internal to telecommunication systems, which can use the computing nodes to access the content in the first blockchain in order to verify or block a telephone call. The first blockchain may be permissioned such that it is only accessible to telecommunication systems and other authorized members of the blockchain network.

In the illustrative example, a telecommunication system (e.g., an originating service provider) can detect a request from a caller to make a telephone call to a recipient using a caller telephone number. A caller telephone number is a telephone number purportedly assigned to the caller. The telecommunication system can then access the first blockchain to determine a unique identifier corresponding to the caller telephone number. The telecommunication system can transmit the unique identifier to another telecommunication system (e.g., a terminating service provider) associated with the recipient of the telephone call. The other telecommunication system can receive the unique identifier and access the first blockchain to confirm whether the unique identifier for the telephone number is correct. If so, the other telecommunication system can authorize the telephone call. Otherwise, the other telecommunication system can block the telephone call.

The illustrative example also includes a second blockchain in the blockchain network. This second blockchain includes relationships between the telephone numbers and additional attributes corresponding thereto. One example of the additional attributes is a caller description (e.g., a caller ID) that briefly characterizes the caller to a recipient. Another example of the additional attributes is a purpose for which the caller uses the telephone number, such as sales, marketing, customer service, or technical support. The second blockchain may be permissioned such that it is accessible to the owners of the telephone numbers to enable the owners to maintain these additional attributes (e.g., to keep them up-to-date).

The other telecommunication system can retrieve at least one of the additional attributes from the second blockchain, for example, subsequent to authorizing the telephone call. The other telecommunication system can then transmit the additional attribute(s) to the recipient. This can provide the recipient with additional information about the caller and/or call purpose, which can enable the recipient to avoid spam and other unwanted calls.

The blockchains can serve as comprehensive, immutable, secure, trusted records that the telecommunication system can rely on to authorize or block telephone calls. The blockchains are comprehensive because each time an attribute related to a telephone number changes, the blockchain network can update one or both of the blockchains to include a new block with the telephone number correlated to an updated set of attributes for the telephone number. This creates a complete historical record indicating how attributes for each telephone number changed over time. Likewise, each time an authorized caller for a telephone number changes, the blockchain network can update one or both of the blockchains to include a new block with the telephone number correlated to a caller tag identifying the new authorized caller. This creates a complete historical record indicating how the caller assignment for each telephone number changed over time. The blockchains are immutable, since blocks cannot be changed or modified once they are incorporated into the blockchains. The blockchains are secure, because their content is encrypted and only members of the blockchain network can access the blockchains. The blockchains are trusted, because only permissioned and trusted members can write to into the blockchain network. And, to further enhanced trust, some examples may include an auditor in the blockchain network who can monitor the blockchain network for discrepancies.

In some examples, the blockchain network may further include a third blockchain. In some examples, the third blockchain has relationships between telephone numbers and behavior descriptors. A behavior descriptor characterizes or quantifies negative behavior. Each time a member of the blockchain network receives a report about a telephone number being used to engage in negative behavior (e.g., spamming, spoofing, unsolicited marketing, or harassment), the blockchain network can update the third blockchain to include a new block with the telephone number and a behavior descriptor associated with the negative behavior. This creates a complete historical record of negative behavior associated with a telephone number. In alternative examples, the third blockchain has relationships between caller tags and behavior descriptors. Each time a member of the blockchain network receives a report about a telephone number being used to engage in negative behavior, the blockchain network can determine a caller associated with the telephone number using the second blockchain. The blockchain network can then update the third blockchain to include a new block with a caller tag identifying the caller and a behavior descriptor associated with the negative behavior. This creates a complete historical record of negative behavior associated with a caller. Either way, one or both of the telecommunication systems can access the third blockchain to determine an overall reputation associated with a telephone number or caller, which the telecommunication system can additionally or alternatively use as a basis to allow or block telephone calls therefrom.

Examples of the present disclosure can provide numerous advantages over conventional approaches to blocking robocalls and other nefarious telephone calls. For instance, the blockchains can serve as extensive records about telephone numbers and callers, with which telecommunication carriers can more reliably screen telephone calls without being over- or under-inclusive. The blockchains may also be more accurate than any single entity's independent records, since the blockchains are maintained and constantly updated by a collective of entities (e.g., telecommunication carriers). The blockchains may further provide more uniformity in how telecommunication carriers screen telephone calls, since telecommunication carriers with access to the blockchains can make screening decisions based on the same set of data.

The description of the illustrative example above is provided merely as an example, not to limit or define the limits of the present subject matter. Various other examples are described herein and variations of such examples would be understood by one of skill in the art. Advantages offered by various examples may be further understood by examining this specification and/or by practicing one or more examples of the claimed subject matter.

Illustrative Systems and Methods for Validating Telephone Calls Using Blockchains FIG. 1 is a block diagram of an example of a system 100 for validating telephone calls using blockchains 110a-d ("BC") according to some aspects. The system 100 includes various computing nodes 104a-f collectively implementing a blockchain network 116 comprising the blockchains 110a-d. The computing nodes 104a-f are distributed among various members of the blockchain network 116, including telecommunication system 102a, telecommunication system 102b, an administrator 108, an auditor 114, and/or any other suitable organization 106. The blockchains 110a-d provide an immutable record of related to telephone number usage, which the telecommunication systems 102a-b can rely on to validate telephone calls and manage negative caller-behavior.

More specifically, the system 100 includes telecommunication systems 102a-b that can access the blockchain network 116 via computing nodes 104a-b. The telecommunication systems 102a-b are operated by telecommunication carriers, such as AT&T®, Verizon®, and T-Mobile®, and house the physical infrastructure for routing telephone calls between callers and recipients. For example, the telecommunications systems 102a-b can each be public switched telephone networks ("PSTN") and/or have respective base stations, switches, local exchanges, and core networks for connecting telephone calls between callers and recipients.

The system 100 also includes an administrator 108 that can access the blockchain network 116 via computing node 104d. The administrator 108 can enroll members in the blockchain network 116, control access to the blockchain network 116, and/or ensure compliance with one or more blockchain policies governing the blockchains 110a-d. They administrator 108 may also monitor the operational characteristics of some or all of the blockchains 110a-d to ensure that the blockchains 110a-d are available (e.g., online) and functioning properly.

The system 100 further includes an auditor 114 that can access the blockchain network 116 via computing node 104e. The auditor 114 can monitor the content of some or all of the blockchains 110a-d to ensure compliance with one or more laws, regulations, or other external policies. The auditor 114 may only have read-only access to the blockchains 110a-d, such that the auditor 114 can read data from the blockchains 110a-d but not write to the blockchains 110a-d.

The system 100 also includes a verifier 118 that can access the blockchain network 116 via computing node 104f. The verifier 118 can vet and verify entities that wish to have their telephone numbers registered in the blockchain network 116. For example, ABC Co may be a legal collections agency that wants to register their telephone numbers with the blockchain network 116. So, the verifier 118 can receive business details from ABC Co and perform a background check on ABC Co to verify that it is a legally registered entity, that it has a valid collections license, that it has few complaints with the Better Business Bureau, and/or that it complies with ethical business practices. If so, then the verifier 118 can verify ABC Co to enable its telephone numbers to be registered with the blockchain network 116.

One or more other organizations 106 may also have direct access to one or more of the blockchains 110a-d. For example, the administrator 108 may enroll a technical support specialist in the blockchain network 116 with full or partial access to one or more of the blockchains 110a-d, in order to help diagnose and resolve technical problems with the blockchains 110a-d.

Third parties 112 may also indirectly access the blockchain network 116 through one of the members discussed above. As used herein, a third party is an entity that does not have direct access to the blockchain network 116 (e.g., that is not a member of the blockchain network 116). For example, a third party 112 may include an owner of a telephone number or a consumer advocacy group performing studies about robocalls or an external auditor. The third party 112 can indirectly access the blockchain network 116 through one of the computing nodes 104a-f in the blockchain network 116, such as the computing node 104b in the telecommunication system 102c. For example, the third party 112 can indirectly access the blockchain network 116 via an application programming interface (API) provided by a computing node 104b. The API may be configured to provide the third party 112 with read access (e.g., read-only access), write access, or both, to some or all of the blockchains 110a-d.

Within the blockchain network 116 is one or more blockchains 110a-d (or "ledgers") distributed among the computing nodes 104a-f. Each of the blockchains 110a-d has a series of sequential, immutable entries referred to as "blocks." Each block is distinct from the block before it, but linked to the prior block via a hashed pointer, thereby creating a sequential chain of blocks or "blockchain." The blockchains 110a-d can serve as trusted records that can be relied on by the telecommunication systems 102a-b to validate telephone calls and manage negative caller-behavior, as discussed in greater detail below.

Figure 2:
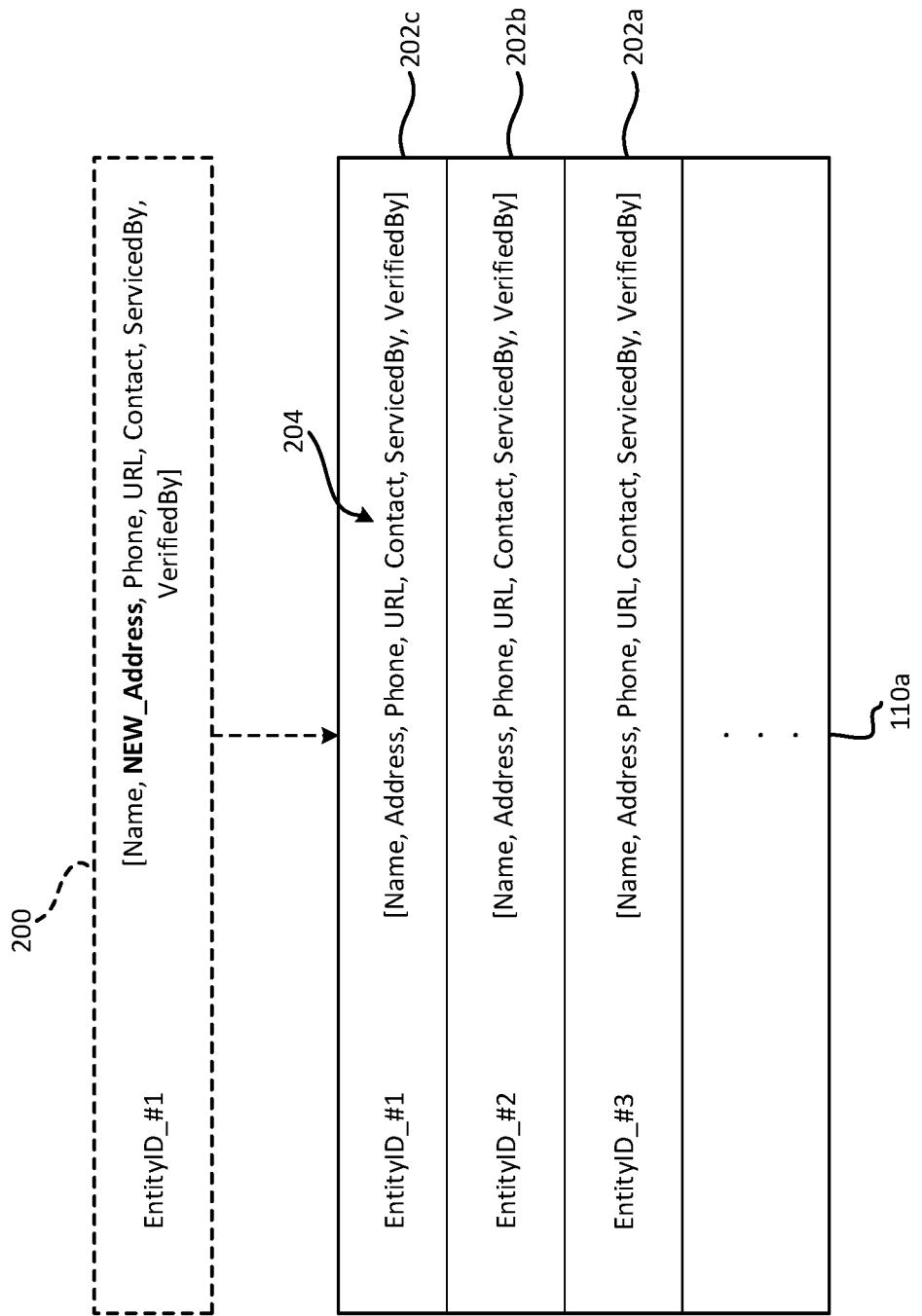
FIG. 2 depicts an example of a first blockchain according to some aspects.

One example of blockchain 110a is depicted in FIG. 2. This blockchain 110a can be referred as the "identity blockchain." Once an entity is validated by the verifier 118, the blockchain network 116 can incorporate a new block into the identity blockchain for that entity.

As shown in FIG. 2, the identity blockchain can include a series of blocks 202a-c, whereby each of the blocks 202a-c includes an entity identifier that uniquely identifies an entity and a corresponding profile for the entity. The profile includes attributes 204 of the entity. The attributes 204 can include a name of the entity. This attribute is depicted in FIG. 2 as "Name." The attributes 204 can also indicate an address of the entity. This attribute is depicted in FIG. 2 as "Address." The attributes 204 can also indicate a contact number for the entity. This attribute is depicted in FIG. 2 as "Phone." The attributes 204 can also include a uniform resource locator (URL) of a website associated with the entity. This attribute is depicted in FIG. 2 as "URL." The attributes 204 can also indicate the name for an employee contact at the entity. This attribute is depicted in FIG. 2 as "Contact." The attributes 204 can also indicate a servicing organization, which is the telecommunication carrier providing telephony services to the entity. This attribute is depicted in FIG. 2 as "ServicedBy." The attributes 204 can also indicate the verifier 118. This attribute is depicted in FIG. 2 as "VerifiedBy." Other examples can include more, fewer, or different attributes than those discussed above.

Each time at least one of the attributes 204 related to an entity changes, a new block can be added to the identity blockchain. For example, if the address for an entity changes, the blockchain network 116 can add a new block to the numbers blockchain indicating the new address for the entity. One example of this is shown in FIG. 2, which depicts a new block 200 for EntityID_#1 being appended to the identity blockchain. The new block 200 has an updated set of attributes indicating the new address (represented as "NEW_Address"). In this way, the blockchain network 116 can periodically update the identity blockchain to maintain a comprehensive record of how attributes related to each entity changed over time, with the most recent block for a telephone number in the identity blockchain having the most current set of attributes.

Figure 3:
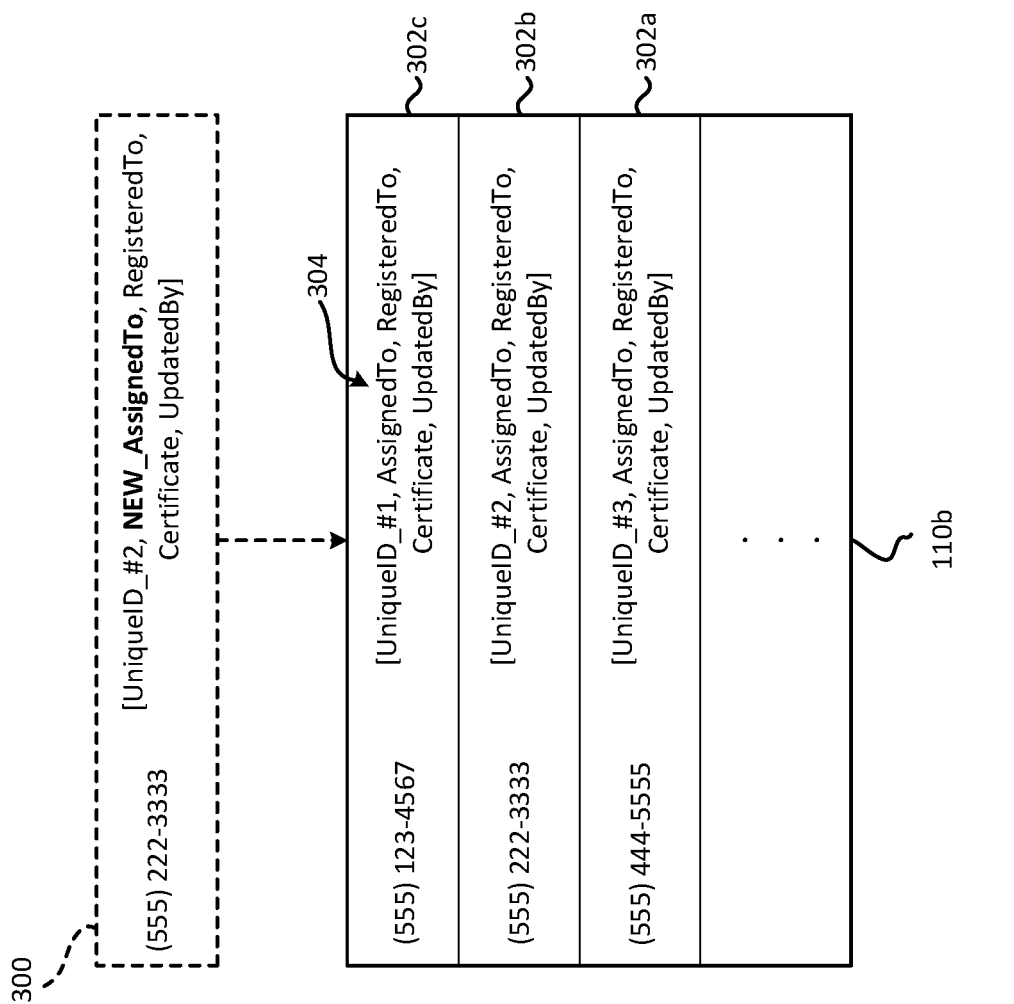
FIG. 3 depicts an example of a second blockchain according to some aspects.

The blockchain network 116 also includes another blockchain 110b, an example of which is depicted in FIG. 3. This blockchain 110b can be referred as the "numbers blockchain." The numbers blockchain includes a series of blocks 302a-c. Each of the blocks 302a-c includes a telephone number and one or more attributes 304 corresponding to the telephone number. The numbers blockchain may be permissioned such that it is only accessible to telecommunication systems 102a-b and other specifically authorized members of the blockchain network 116.

In some examples, the attributes 304 can include a unique identifier for a telephone number. This attribute is depicted in FIG. 3 as "UniqueID_#X." The unique identifier assigned to each telephone number is different from all of the other unique identifiers assigned to the other telephone numbers, and may be a randomly generated alphanumeric identifier that is assigned to the telephone number. The attributes 304 can also include an assignment identifier indicating an assignee, which is an entity assigned to use the telephone number. This attribute is depicted in FIG. 3 as "AssignedTo." In one example, the assignment identifier may identify "ABC Co" The attributes 304 can also include an ownership identifier indicating an owner, which is an entity owning (e.g., paying for) the telephone number. This attribute is depicted in FIG. 3 as "OwnedBy." In one example, the ownership identifier may identify "XYZ Co," which may be a parent of ABC Co or an outsourced vendor providing telephony services for ABC Co. The attributes 304 can also include certificate data proving ownership of the telephone number. This attribute is depicted in FIG. 3 as "Certificate." The certificate data can include an encrypted certificate generated by a telecommunication system upon provisioning the telephone number to the owner. The attributes 304 can also include an updating entity identifier indicating an updating entity, which is an entity authorized to update the attributes 304. This attribute is depicted in FIG. 3 as "UpdatedBy." Other examples can include more, fewer, or different attributes than those discussed above.

Each time a telecommunication system provisions a new telephone number to an entity, the telecommunication system can add a new block corresponding to the new telephone number into the numbers blockchain. For example, the telecommunication system can determine a unique identifier, certificate data, and/or other attributes associated with the new telephone number. The telecommunication system can then insert a new block into the blockchain having the new telephone number correlated to the unique identifier, certificate data, and/or other attributes.

Additionally, each time at least one of the attributes 304 related to a telephone number changes, a new block can be added to the numbers blockchain. For example, if the assignee for a telephone number changes, the updating entity can add a new block to the numbers blockchain indicating the new assignee for the telephone number. One example of this is shown in FIG. 3, which depicts a new block 300 for the telephone number "(555) 222-3333" being appended to the numbers blockchain. The new block 300 has an updated set of attributes indicating the new assignee (represented as "NEW_AssignedTo"). In this way, the updating entity can periodically update the numbers blockchain to maintain a comprehensive record of how attributes related to each telephone number changed over time, with the most recent block for a telephone number in the numbers blockchain having the most current set of attributes.

Figure 4:
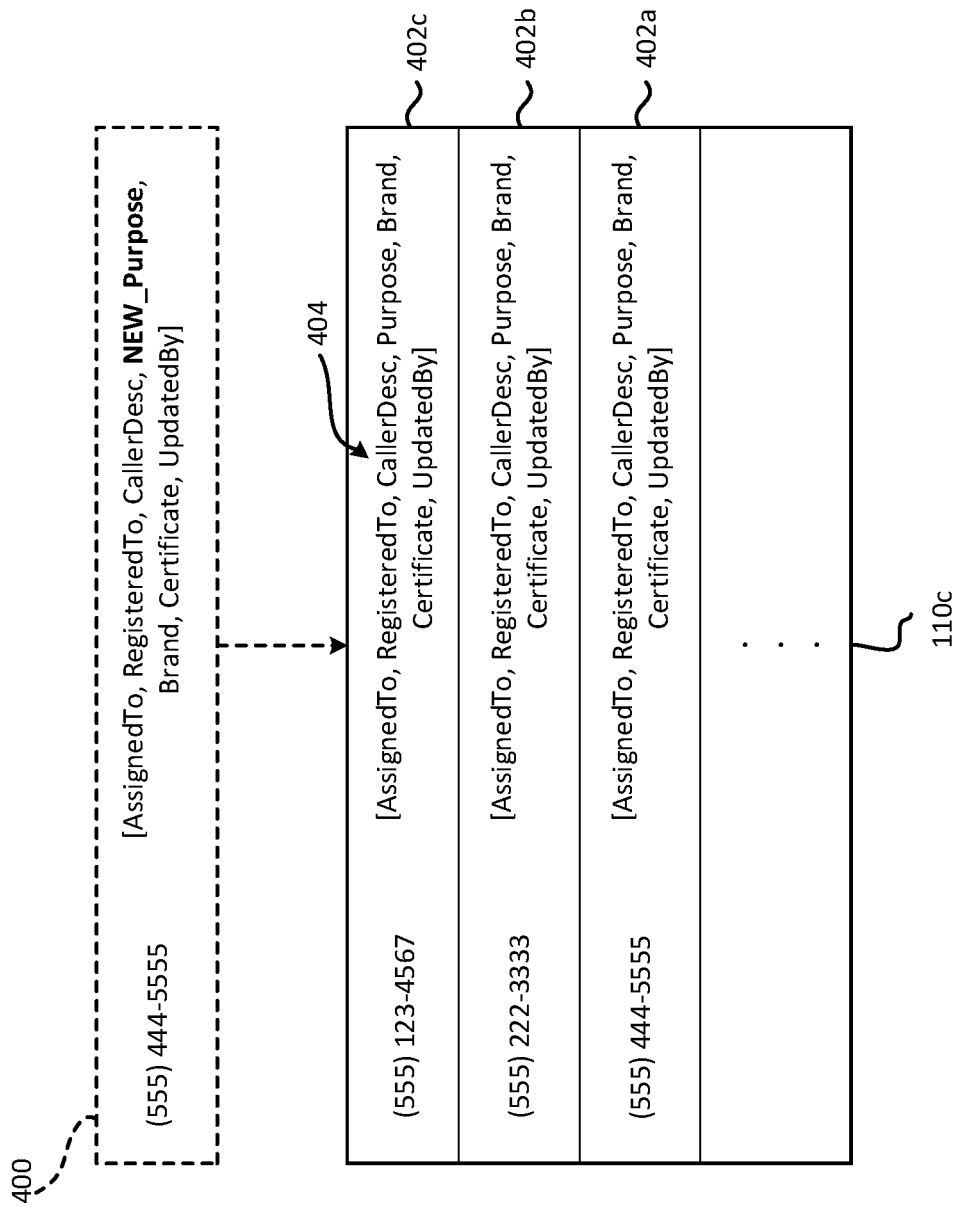
FIG. 4 depicts an example of a third blockchain according to some aspects.

In some examples, the blockchain network 116 can also include another blockchain 110c, an example of which is depicted in FIG. 4. This blockchain 110c can be referred as the "descriptive information blockchain." The descriptive information blockchain also includes a series of blocks 402a-c. Each of the blocks 402a-c includes a telephone number and one or more attributes 304 corresponding to the telephone number. The descriptive information blockchain may be permissioned such that it is accessible to the owners of the telephone numbers (e.g., via the API of FIG. 1) to enable the owners to periodically update the attributes 404. For example, the attributes 404 for the phone number "(555) 123-4567" of block 402c may be accessible to the owner of that telephone number so that they can be periodically updated by the owner.

The attributes 404 may include some or all of the attributes 304 discussed above in relation to FIG. 3. For example, the attributes 404 can include most of attributes 304, except for the unique identifier for each telephone number. The attributes 404 may exclude the unique identifiers because it may be desirable to keep this information secret from third parties (e.g., the owners) for security purposes. The attributes 404 can additionally or alternatively include a caller description that briefly characterizes the caller to a recipient. This attribute is depicted in FIG. 4 as "CallerDesc." One example of the caller description may be a caller ID, such as "Pizza House." The attributes 404 can also indicate a purpose for which the caller uses the telephone number. This attribute is depicted in FIG. 4 as "Purpose." Examples of the purpose can include sales, marketing, or technical support. The attributes 404 can also indicate a brand associated with the telephone number. This attribute is depicted in FIG. 4 as "Brand." Other examples can include more, fewer, or different attributes than those discussed above.

Each time a telecommunication system provisions a new telephone number to an entity, the telecommunication system can add a new block corresponding to the new telephone number into the descriptive information blockchain. For example, the telecommunication system can insert a new block into the blockchain having the new telephone number correlated to a unique identifier, certificate data, and/or other attributes. These attributes may have previously been determined by the telecommunication system in order to update the numbers blockchain based on the new telephone number.

Additionally, each time at least one of the attributes 404 related to a telephone number changes, a new block can be added to the descriptive information blockchain. For example, if the purpose for a telephone number changes, the blockchain network 116 can add a new block to the descriptive information blockchain indicating the new purpose for the telephone number. One example of this is shown in FIG. 4, which depicts a new block 400 for the telephone number "(555) 444-5555" being appended to the descriptive information blockchain. The new block 400 has an updated set of attributes indicating the new purpose (represented as "NEW_Purpose"). In this way, the blockchain network 116 can periodically update the descriptive information blockchain to maintain a comprehensive record of how attributes related to each telephone number changed over time, with the most recent block for a telephone number in the descriptive information blockchain having the most current set of attributes.

Figure 5:
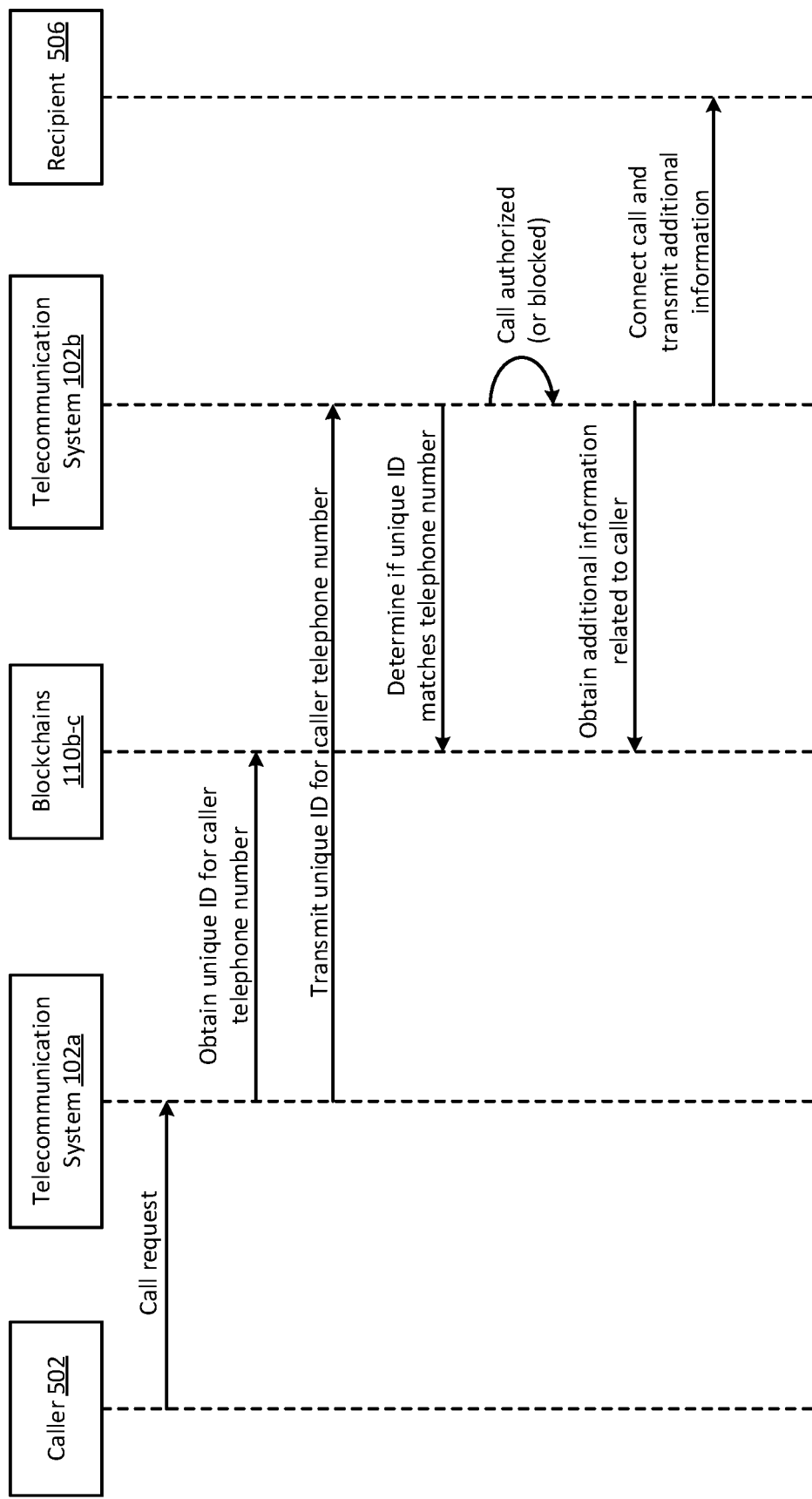
FIG. 5 is a sequence diagram of an example of a process for validating telephone calls according to some aspects.

The blockchain network 116 can use the blockchains 110b-c in various processes, for example the process shown in FIG. 5. Other examples can include more steps, fewer steps, different steps, or a different order of the steps than is shown in FIG. 5.

As shown in FIG. 5, the process begins with a caller 502 transmitting a call request to a telecommunication system 102*a*, which can be an originating service provider. The call request is a request by the caller 502 to place a telephone call using a caller telephone number to a recipient 506. The call request may include a session initial protocol (SIP) invite having a SIP header, into which the caller 502 can insert the caller telephone number among other information.

The telecommunication system 102*a* detects the call request and responsively obtains a unique identifier corresponding to the caller telephone number. For example, the telecommunication system 102*a* can access blockchain 110*b* to determine the unique identifier belonging to the caller telephone number. In situations where there are multiple blocks in the blockchain 110*b* related to the caller telephone number, the telecommunication system 102*a* accesses the most recent block in blockchain 110*b* associated with the telephone number, since this block will have the most current information.

After determining the unique identifier belonging to the caller telephone number via blockchain 110*b*, the telecommunication system 102*a* transmits a communication comprising the unique identifier to telecommunication system 102*b*. In one example, the communication is a modified version of the SIP invite in which the unique identifier has been inserted into the SIP header.

The telecommunication system 102*b* can receive the communication and extract the unique identifier. For example, telecommunication system 102*b* can receive the SIP invite from the telecommunication system 102*a* and extract the unique identifier from the SIP header. The telecommunication system 102*b* can then determine if the unique identifier matches the caller telephone number. For example, the telecommunication system 102*b* can access blockchain 110*b* to match the received unique identifier to the caller telephone number. In situations where there are multiple blocks in the blockchain 110*b* related to the caller telephone number, the telecommunication system 102*a* accesses the most recent block in blockchain 110*b* associated with the telephone number to perform the matching, since this block will have the most current information.

Since unauthorized callers cannot access blockchain 110*b* and therefore do not know the correct unique identifier for the caller telephone number, attempts to manipulate (e.g., spoof) the telephone call as it propagates between the telecommunication systems 102*a-b* will result in a mismatch at telecommunication system 102*b*. As a result, the telecommunication system 102*b* can effectively allow or block the telephone call depending on whether the unique ID matches the caller telephone number in the blockchain 110*b*.

If the unique ID matches the caller telephone number in the blockchain 110*b*, the telecommunication system 102*b* can allow the telephone call. The telecommunication system 102*b* may also obtain additional information related to the caller 502 from the blockchain 110*c*. The telecommunication system 102*b* can provide this additional information to the recipient 506 upon connecting the telephone call. For example, the telecommunication system 102*b* can use the blockchain 110*c* to determine a caller description corresponding to the caller telephone number and transmit the caller descriptor to the recipient 506. The telecommunication system 102*b* may also transmit a verification notification to the recipient 506, where the verification notification indicates that the telephone call is verified.

If the unique ID does not match the caller telephone number in the blockchain 110*b*, the telecommunication system 102*b* can flag the telephone call. The telecommunication system 102*b* can then take appropriate action in relation to the flagged telephone call. Examples of such actions may include blocking the flagged telephone call, notifying an auditor of the flagged telephone call, and/or notifying the authorities (e.g., the Better Business Bureau) of the flagged telephone call.

Figure 6:
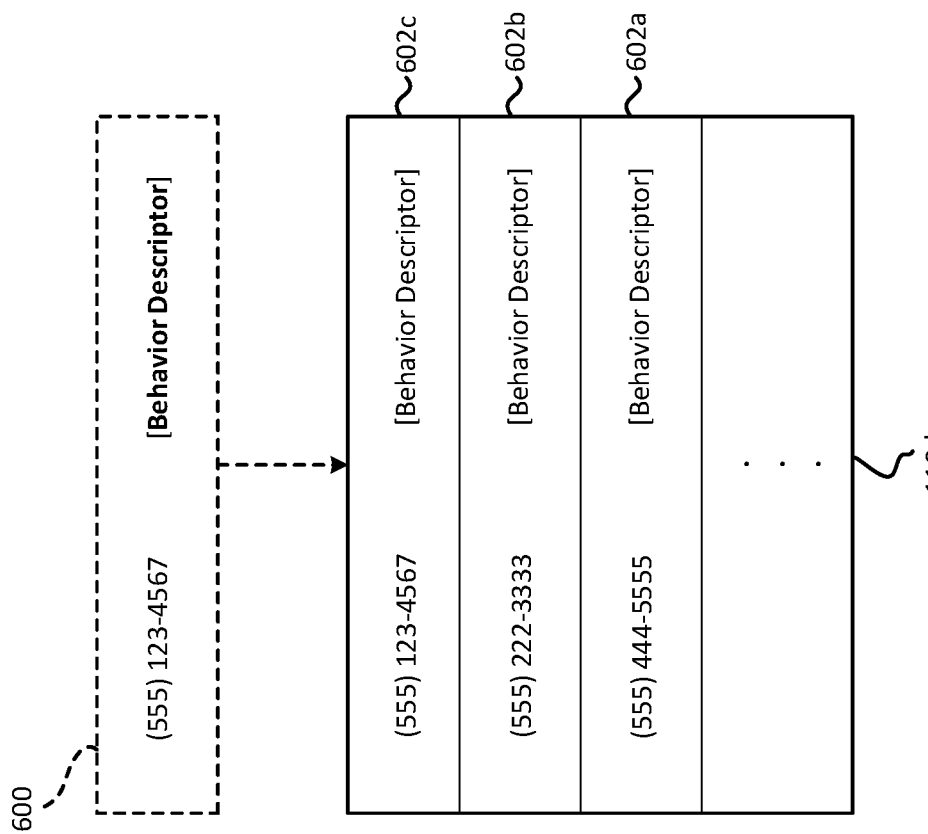
FIG. 6 depicts an example of a fourth blockchain according to some aspects.

Some examples may involve yet another blockchain 110*d*, an example of which is depicted in FIG. 6. This blockchain 110*d* can be referred as the "behavior blockchain." The behavior blockchain also includes a series of blocks 602*a-c*. In the example shown in FIG. 6, each of the blocks 602*a-c* includes a telephone number and a behavior descriptor associated with the telephone number. But in other examples, each of the blocks 602*a-c* can additionally or alternatively include a unique identifier for a particular telephone number and a behavior descriptor associated with the telephone number.

The behavior descriptor may be a unique code characterizing a particular type of negative behavior, such as spamming, spoofing, unsolicited marketing, or harassment. Alternatively, the behavior descriptor may be a numeric score quantifying a particular type of negative behavior. Higher numeric scores can be assigned to relatively worse behavior. A total score can be determined by aggregating the individual scores in the blocks in the behavior blockchain, with higher total scores corresponding to more suspect telephone numbers. Alternatively, the behavior descriptor may include the content of a report submitted by a third party (e.g., an end user) about the negative behavior.

For example, the blockchain network 116 may periodically receive reports of negative behavior. Each time the blockchain network 116 receives such a report, a new block can be added to the behavior blockchain. For example, if the blockchain network 116 receives a report of a particular telephone number engaging in spamming, the blockchain network 116 can add a new block to the behavior blockchain indicating that the particular telephone number engaged in spamming. One example of this is shown in FIG. 6, which depicts a new block 600 for a telephone number being appended to the behavior blockchain. The new block 600 has a behavior descriptor associated with a negative behavior corresponding to the telephone number. The behavior descriptor can be a code (e.g., SPAM) indicating a particular type of the negative behavior, a score (e.g., 26) assigned to the particular type of negative behavior, or the content of the report itself (e.g., "I am very angry that this telephone number keeps calling me at all hours of the day completely unsolicited!"). In this way, the blockchain network 116 can periodically update the behavior blockchain to maintain a comprehensive record of negative behavior associated with telephone numbers, with the most recent block for a telephone number indicating the most current negative behavior.

The negative behavior in the behavior blockchain can also be linked back to the callers associated with the telephone numbers (e.g., using other blockchains described herein), which may enable the telecommunication system 102 to take corrective action with respect to callers repeatedly engaging in negative behavior. For example, the blockchain network 116 can use the behavior blockchain to correlate negative behavior in a certain telephone number. The blockchain network 116 then then determine an entity (e.g., the assignee and/or owner) linked to the telephone number in the numbers blockchain. Finally, the blockchain network 116 can use the identity blockchain to determine specific details about the entity. The blockchain network 116 can use these specific details to take corrective action with respect to the entity, for example by revoking some or all certifications for telephone numbers associated with the entity.

Figure 7:
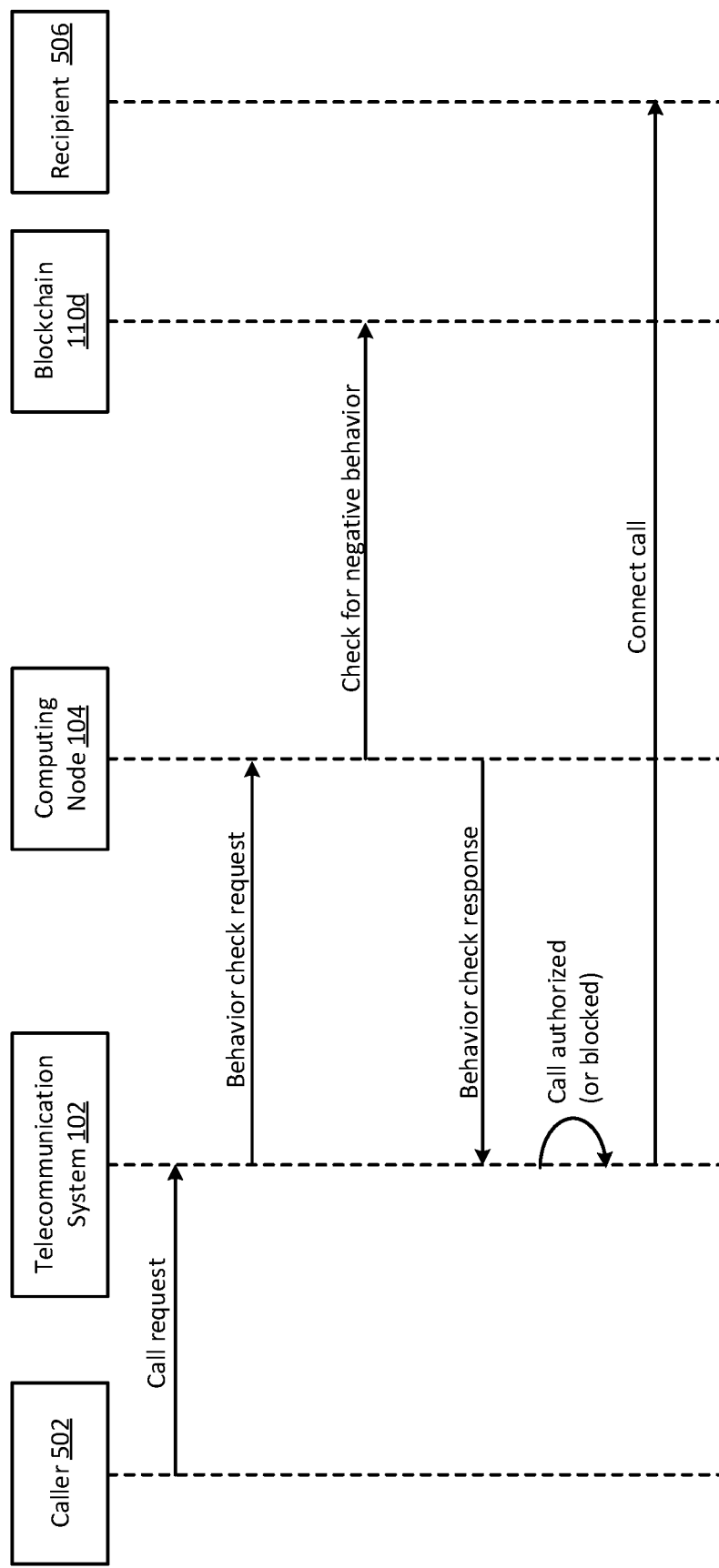
FIG. 7 is a sequence diagram of another example of a process for validating telephone calls according to some aspects.

In some examples, the system 100 can use the behavior blockchain to more readily identify and monitor poor behavior. One example of this process is shown in FIG. 7, which may or may not be combined with one or more of the processes discussed above in relation to FIG. 5. Other examples can include more steps, fewer steps, different steps, or a different order of the steps than is shown in FIG. 7.

As shown in FIG. 7, the process begins with a caller 502 transmitting a call request to a telecommunication system 102. The call request is a request by the caller 502 to place a telephone call using a caller telephone number to a recipient 506. The telecommunication system 102 detects the call request and responsively checks for corresponding negative behavior. In one example, the telecommunication system 102 detects that a caller is placing the telephone call using a particular telephone number and transmits a behavior check request to the computing node 104. The computing node 104 receives the behavior check request and responsively accesses blockchain 110*d* to check for negative behavior associated with the telephone number or the caller. For example, the computing node 104 can determine if the total number of blocks related to the telephone number or caller in the behavior blockchain exceeds a threshold amount. If so, the computing node 104 can transmit a behavior check response back to the telecommunication system 102 indicating that the telephone call is suspect. Otherwise, the computing node 104 can transmit a behavior check response back to the telecommunication system 102 indicating that the telephone call appears legitimate. As another example, computing node 104 can determine if a total score for the telephone number or caller in the behavior blockchain exceeds a threshold amount. If so, the computing node 104 can transmit a behavior check response back to the telecommunication system 102 indicating that the telephone call is suspect. Otherwise, the computing node 104 can transmit a behavior check response back to the telecommunication system 102 indicating that the telephone call appears legitimate.

The telecommunication system 102 can receive the behavior check response from the computing node 104 and allow or block the telephone call depending on the behavior check response. For example, the telecommunication system 102 can connect the telephone call if the behavior check response indicates that the telephone call appears legitimate. Alternatively, the telecommunication system 102 can flag the telephone call if the behavior check response indicates that the telephone call is suspect. The telecommunication system 102 can then take appropriate action in relation to the flagged telephone call, which may include blocking the flagged telephone call, notifying an auditor of the flagged telephone call, and/or notifying the authorities of the flagged telephone call.

Figure 8:
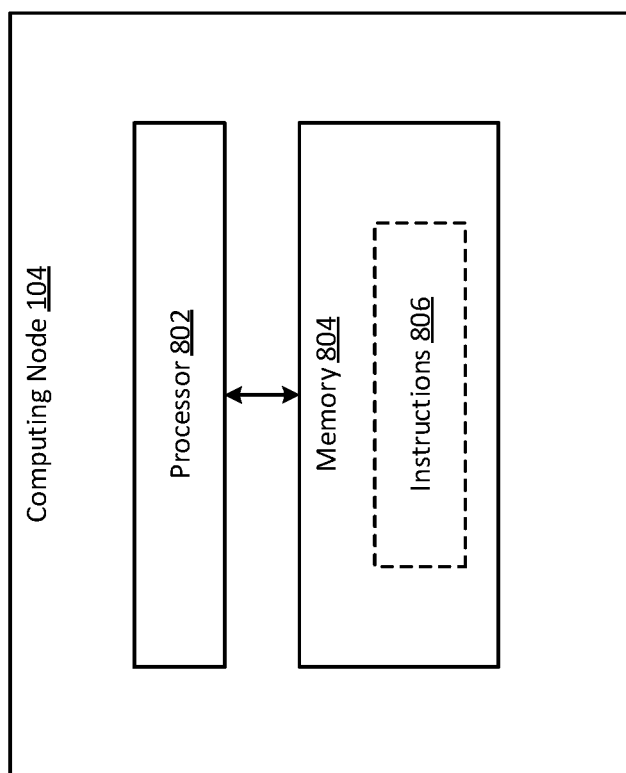
FIG. 8 is a block diagram of an example of a computing node according to some aspects.

FIG. 8 is a block diagram of an example of a computing node 104 according to some aspects. The computing node 104 includes a processing device 802 communicatively coupled with a memory device 804. The processing device 802 can include one processing device or multiple processing devices. Non-limiting examples of the processing device 802 include a Field-Programmable Gate Array (FPGA), an application-specific integrated circuit (ASIC), a microprocessor, etc. The processing device 702 can execute instructions 806 stored in the memory device 804 to perform operations. In some examples, the instructions 806 can include processor-specific instructions generated by a compiler or an interpreter from code written in any suitable computer-programming language, such as C, C++, C#, etc.

The memory device 804 can include one memory device or multiple memory devices. The memory device 804 can be non-volatile and may include any type of memory device that retains stored information when powered off. Non-limiting examples of the memory device 804 include electrically erasable and programmable read-only memory (EEPROM), flash memory, or any other type of non-volatile memory. In some examples, at least some of the memory device can include a medium from which the processing device 802 can read instructions 806. A computer-readable medium can include electronic, optical, magnetic, or other storage devices capable of providing the processing device 802 with computer-readable instructions 806 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 806.

The foregoing examples are not limited to the precise number and arrangement of blockchain network members, blockchains, components, and/or steps described above. Other examples can involve other combinations or arrangements of these. For instance, the administrator 108 can also being the verifier 118 in some examples. Further, the blockchains 110*a-d* can be combined in some examples in order to reduce the total number of blockchains in the blockchain network 116. In one such example, some or all of the information from the descriptive information blockchain and/or the behavior blockchain can be incorporated into the numbers blockchain, resulting in fewer total blockchains (e.g., a single blockchain). The present disclosure is also not limited to blockchains, and other examples may involve other types of distributed ledgers having any number and combination of the features described herein. Numerous other modifications, adaptations, and uses thereof will be apparent to those skilled in the art without departing from the scope of the disclosure.

The invention claimed is:

1. A computing node comprising:
a processor; and
a memory including instructions that are executable by the processor to cause the processor to:
determine a telephone number associated with a telephone call between a caller and a recipient;
determine a unique identifier associated with the telephone number; and
verify the telephone call based on whether the unique identifier is correlated to the telephone number in a blockchain distributed across a plurality of computing nodes in a plurality of telecommunication systems.

2. The computing node of claim 1, wherein the memory further includes instructions that are executable by the processor to cause the processor to:
access the blockchain to determine whether the telephone number corresponds to the unique identifier in the blockchain; and
transmit a signal for authorizing the telephone call, in response to determining that the telephone number corresponds to the unique identifier in the blockchain.

3. The computing node of claim 1, wherein the memory further includes instructions that are executable by the processor to cause the processor to:
access the blockchain to determine whether the telephone number corresponds to the unique identifier in the blockchain; and flag the telephone call in response to determining that the telephone number does not correspond to the unique identifier in the blockchain.

4. The computing node of claim 1, wherein the memory further includes instructions that are executable by the processor to cause the processor to:
determine a behavior descriptor associated with the telephone number; and
flag the telephone call based on the behavior descriptor.

5. The computing node of claim 4, wherein the memory further includes instructions that are executable by the processor to cause the processor to determine the behavior descriptor by accessing a distributed ledger, the distributed ledger including associations between behavior descriptors and telephone numbers.

6. The computing node of claim 1, wherein the memory further includes instructions that are executable by the processor to cause the processor to maintain at least a portion of the blockchain.

7. The computing node of claim 1, wherein each block in the blockchain includes (i) a respective telephone number (ii) a respective unique identifier assigned to the respective telephone number, and (iii) a respective attribute associated with the respective telephone number, the respective attribute being different from the respective telephone number and the respective unique identifier.

8. The computing node of claim 1, wherein the memory further includes instructions that are executable by the processor to cause the processor to determine the unique identifier by:
receiving a communication from a telecommunication system of the plurality of telecommunication systems, the communication being separate from the blockchain and being associated with the caller requesting to make the telephone call to the recipient; and
extracting the unique identifier from the communication.

9. A method comprising:
determining, by a processor, a telephone number associated with a telephone call between a caller and a recipient;
determining, by the processor, a unique identifier associated with the telephone number; and
verifying, by the processor, the telephone call based on whether the unique identifier is correlated to the telephone number in a blockchain distributed across a plurality of computing nodes in a plurality of telecommunication systems.

10. The method of claim 9, further comprising:
accessing, by the processor, the blockchain to determine whether the telephone number is correlated to the unique identifier in the blockchain; and
transmitting, by the processor, a signal for authorizing the telephone call, in response to determining that the telephone number is correlated to the unique identifier in the blockchain.

11. The method of claim 9, further comprising:
accessing, by the processor, the blockchain to determine whether the telephone number is correlated to the unique identifier in the blockchain; and
flagging, by the processor, the telephone call in response to determining that the telephone number is not correlated to the unique identifier in the blockchain.

12. The method of claim 9, further comprising:
determining, by the processor, a behavior descriptor associated with the telephone number; and
flagging, by the processor, the telephone call based on the behavior descriptor.

13. The method of claim 12, further comprising:
determining, by the processor, the behavior descriptor by accessing a distributed ledger, the distributed ledger including associations between behavior descriptors and telephone numbers.

14. The method of claim 9, further comprising:
maintaining, by the processor, at least a portion of the blockchain.

15. The method of claim 14, wherein each block in the blockchain includes (i) a respective telephone number (ii) a respective unique identifier assigned to the respective telephone number, and (iii) a respective attribute associated with the respective telephone number, the respective attribute being different from the respective telephone number and the respective unique identifier.

16. The method of claim 9, further comprising determining the unique identifier by:
receiving a communication from a telecommunication system of the plurality of telecommunication systems, the communication being separate from the blockchain and being associated with the caller requesting to make the telephone call to the recipient; and
extracting the unique identifier from the communication.

17. A non-transitory computer-readable medium comprising program code that is executable by a processor to cause the processor to:
determine a telephone number associated with a telephone call between a caller and a recipient;
determine a unique identifier associated with the telephone number; and
verify the telephone call based on whether the unique identifier corresponds to the telephone number in a blockchain distributed across a plurality of computing nodes in a plurality of telecommunication systems.

18. The non-transitory computer-readable medium of claim 17, further comprising program code that is executable by the processor to cause the processor to:
access the blockchain to determine whether the telephone number corresponds to the unique identifier in the blockchain; and
transmit a signal for authorizing the telephone call, in response to determining that the telephone number corresponds to the unique identifier in the blockchain.

19. The non-transitory computer-readable medium of claim 17, further comprising program code that is executable by the processor to cause the processor to:
access the blockchain to determine whether the telephone number corresponds to the unique identifier in the blockchain; and
flag the telephone call in response to determining that the telephone number does not correspond to the unique identifier in the blockchain.

20. The non-transitory computer-readable medium of claim 17, further comprising program code that is executable by the processor to cause the processor to:
determine a behavior descriptor associated with the telephone number by accessing distributed ledger; and
flag the telephone call based on the behavior descriptor.

* * * * *